Oct. 6, 1925.
H. SCHAEFER
1,556,035
THEFT ALARM FOR MOTOR VEHICLES
Filed Jan. 13, 1925
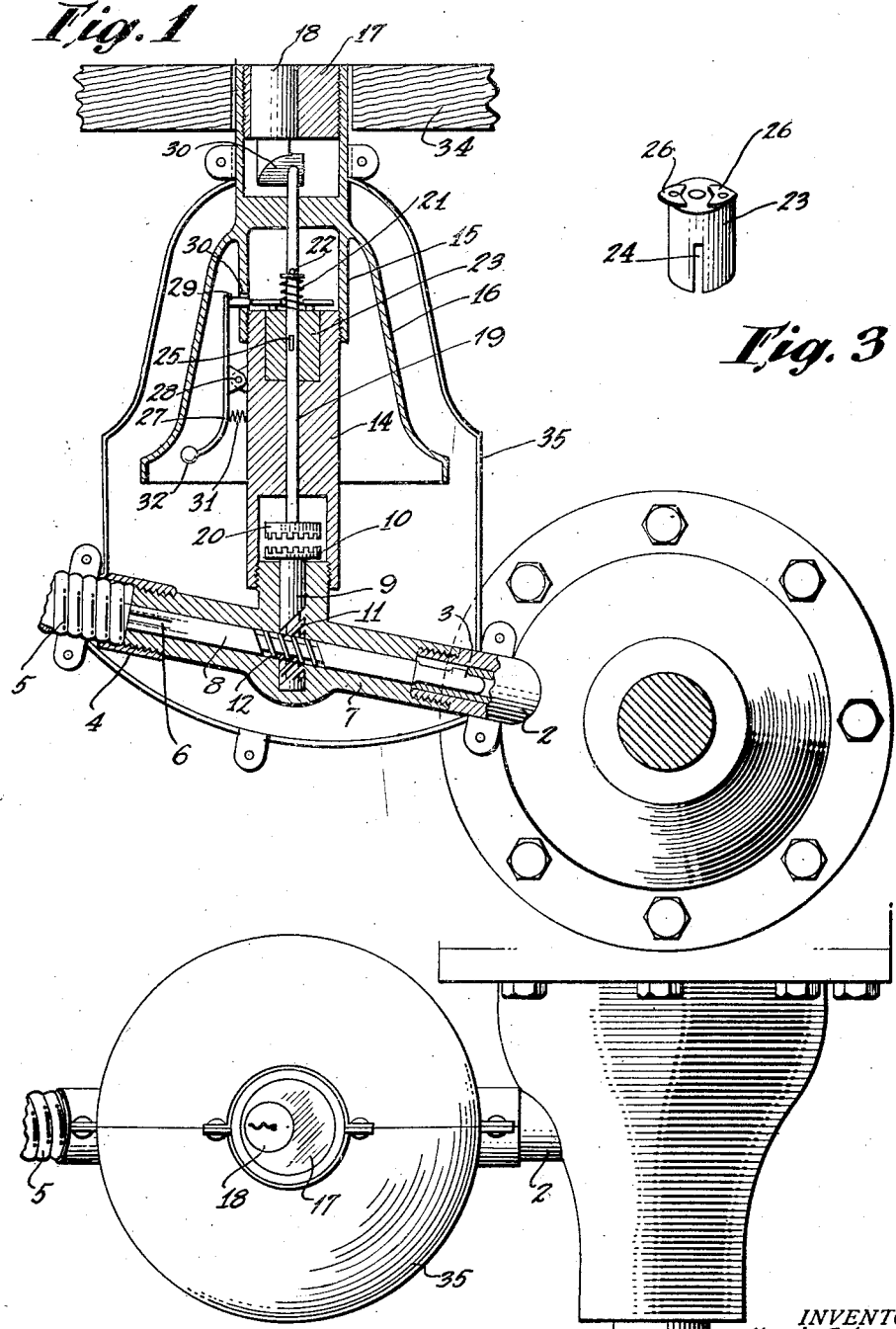
INVENTOR.
Henri Schaefer
BY Jas. H. Griffin.
ATTORNEYS.

Patented Oct. 6, 1925.

1,556,035

UNITED STATES PATENT OFFICE.

HENRI SCHAEFER, OF NEW YORK, N. Y.

THEFT ALARM FOR MOTOR VEHICLES.

Application filed January 13, 1925. Serial No. 2,143.

*To all whom it may concern:*

Be it known that I, HENRI SCHAEFER, a citizen of Switzerland, residing at New York city, county and State of New York, have invented a certain new and useful Theft Alarm for Motor Vehicles, of which the following is a specification.

This invention is a theft alarm adapted to be associated with a motor vehicle, so that in the event of attempted theft, an audible alarm will be sounded. Various expedients have heretofore been resorted to in protecting motor vehicles against theft, but they have generally been associated with either the ignition or induction system of a motor.

The object of the present invention is to provide a simple and efficient, purely mechanical arrangement adapted to be incorporated in the speedometer drive mechanism and comprising, generally speaking, a driving element intended to be interposed between the drive shaft of the speedometer and the driven part of the vehicle which normally serves to drive said shaft, so that in installing the device the speedometer shaft can be uncoupled from its driving member and the present invention interposed between these parts. This produces a very simple and convenient manner of assembly and one which can be carried out with ease and dispatch. On the intermediate element is mounted the alarm means which, in practice, is key controlled and is adapted, when set, to be driven simultaneously with the speedometer when the car is started so that the starting of the car will be accompanied by the giving of the alarm.

In its preferred practical form, the said intermediate member comprises a shaft to which is geared a stub shaft. Alined with the stub shaft is a spindle normally maintained free from driven relation with the stub shaft. A key actuated lock is utilized to move the spindle in the direction of the stub shaft and the stub shaft and spindle are provided on their contiguous ends with clutch elements, which, when engaged, permit of the driving of the spindle. Locked for rotation with the spindle is means for operating the clapper of a bell, which bell is mounted to be struck by the clapper when the latter is operated through rotation of the spindle, so that through the mechanism described, the starting of the vehicle will result in the giving of an alarm.

Features of the invention, other than those specified, will be apparent from the hereinafter detailed description and claims, when read in conjunction with the accompanying drawings.

The accompanying drawings illustrate one practical embodiment of the invention, but the construction therein shown is to be understood as illustrative, only, and not as defining the limits of the invention.

Figure 1 shows an alarm mechanism embodying the present invention in central section and illustrated as associated with the cooperating parts of a vehicle.

Figure 2 is a plan view of the construction shown in Figure 1; and,

Figure 3 is a perspective view of one of the elements of the construction.

Referring to the drawings, 1 designates the universal joint cover of a motor vehicle and 2 the integrally formed nipple into which extends the driving element 3 commonly utilized to drive the speedometer of the vehicle. The nipple 2 is generally threaded to receive the coupling 4 of the speedometer shaft which is housed within a flexible cable 5. The coupling 4 is ordinarily screwed upon the nipple 2 for the purpose of bringing the keyed end 6 of the speedometer shaft into engagement with the driving element 3 which has a keyed socket to receive the shaft end. Through these connections, the speedometer is driven.

Now in accordance with the present invention, the alarm hereinafter described is adapted to be interposed between the nipple and the coupling 4 after the coupling has been removed from the nipple. To permit of this, a substantially T-shaped casting 7 is provided, the opposite ends of which are respectively interiorly and exteriorly threaded, so that one end of the casting may be secured on to the nipple while the other end is adapted to receive the coupling 4. Extending through the casting and journalled for rotation therein is a shaft 8, the opposite ends of which are made complementary to the elements with which they are adapted to cooperate so that when the parts are assembled, one end of the shaft 8 will be interlocked for rotation with the driving element 3, while the other end of said shaft will be interlocked for driving relation with the speedometer shaft. By assembling the parts in this manner, the casting 7 is rigidly mounted on the cover of the universal joint, while the speedometer shaft is driven from the element 3 through the shaft 8.

Extending vertically through the upright arm of the T-shaped casting is a stub shaft 9, the upper end of which is provided with a clutch member 10, while the lower portion of which is provided with a worm 11 meshing with a worm 12, formed on the shaft 8, so that the stub shaft 9 is driven from the shaft 8.

The upstanding arm of the T is exteriorly threaded and on to this arm is secured a standard 14. The upper end of the standard is exteriorly threaded to receive a hollow hub 14 of a bell 16. The hub of the bell extends above as well as into the body of the bell and the upwardly extending portion of said hub is chambered to receive a lock 17 permanently secured in place in any suitable manner and provided with a key operated rotatable barrel 18.

Extending vertically through the standard 14 and mounted for rotation therein is a spindle 19, the lower end of which carries a clutch member 20 normally disengaged from the clutch member 10 by means of a spring 21 which serves to elevate the spindle. The upper end of this spring acts against a pin 22 passed through the spindle, while the lower end of the spring acts against a plug 23 mounted for rotation in a pocket in the upper end of the standard. The plug 23 is circular and is provided at one side with a radially extending slot 24, which receives a key 25 carried by the spindle, so as to lock the plug to the spindle, but to permit of raising and lowering of the spindle without corresponding movement of the plug, which is maintained seated in the pocket of the standard by the spring 21.

Pivoted on the upper face of the plug 23 are two small cam members 26 whose function is to operate the clapper of the bell. This clapper, which is designated in the drawings by the reference character 27 is pivoted at 28 on the standard and its upper end is provided with a nose 29 projecting through an opening 30 in the hub of the bell and into the path of the cams 26. A spring 31 normally impels the weighted end 32 of the clapper into engagement with the bell.

Under ordinary conditions, the spring 21 will raise the spindle to maintain the clutch member 20 free from engagement with the member 10, so as to enable the driver of the car to operate said vehicle without giving an alarm. Associated with the lock barrel 18, however, is a cam 33 so shaped that when the lock barrel is in normally unlocked position, the spindle will be permitted to elevate, but adapted, when the lock barrel is rotated to a locked position, to depress the spindle sufficiently to effect the engagement of the clutch member 20 with the clutch member 10. Thus, when the driver wishes to leave the car, the lock barrel is shifted by means of a suitable key into the latter position, whereupon operation of the car will cause the spindle to be rotated with the result that the plug 23 is simultaneously rotated, while the small cam members 26 strike the nose of the clapper and operate the latter.

A rapid oscillation of the clapper about its pivot point 28 results and the bell is sounded. This operation will continue so long as the car continues to move, so that the surreptitious removal of the car is precluded.

In practice the parts are so mounted and proportioned that the lock will occupy an opening or hole in the floor boards 34 directly in front of the driver's seat, so that the lock will be in a convenient position to the driver upon entering or leaving the car.

It is desirable in order to preclude tampering with the alarm mechanism to house the same within a suitable casing and in practice this casing, which is designated in the drawings generally by the reference character 35 is formed in two parts adapted to be secured in face abutting relation by bolts, rivets or otherwise, so as to entirely conceal the bell and those operating parts of the construction which are directly beneath it. When the casing is in position, the parts will be entirely enclosed. The casing is preferably perforated or provided with suitable holes so that the ringing of the bell may be readily heard.

It will be noted from the foregoing detailed description that the present invention may be expeditiously associated with conventional automobile construction in a simple and expeditious manner and after assembly will efficiently protect a car against theft since it is well known that automobile thieves fear noise and in the event of noise will leave the car and make their getaway as quickly as possible.

It is to be noted that with the arrangement shown, the alarm will be sounded whether the engine is run or the car towed as the universal joint is at all times connected with the rear wheels and the rotation of the rear wheels must be accompanied by a rotation of said joint. Consequently movement of the car cannot be accomplished without the accompanying alarm if the lock has been moved to a position to operatively connect the alarm with the moving parts of the car.

The drawings show the invention in its preferred practical form but the invention is to be understood as fully commensurate with the appended claims.

I wish to particularly point out that the clutch members 10 and 20 are so shaped that they will lock the shaft 9 and the spindle 19 for relative rotation in both directions so that the spindle will be turned whether the car is moved ahead or backwards. It will be noted that the cam members 26 are so shaped that they will operate the clapper when rotated in either direction and the slight pivotal movement of which these cam members are capable allows them to retract the clapper and then suddenly release it.

It will be seen in Figure 3 that the inner ends of the cam members are concave and the pivotal movement of these cam members is limited by the spindle, so that while they can shift slightly to effect operation of the clapper they cannot get out of position.

Having thus fully described the invention, what I claim as new and desire to secure by Letters Patent is:

1. A theft alarm for motor vehicles embodying a bracket, one end of which is adapted to be secured to the speedometer nipple of a motor car chassis and the other end of which is adapted to be secured to the flexible conduit of the speedometer drive shaft of such vehicle, a shaft carried by the bracket, one end of which is adapted to be operatively connected to the speedometer shaft and the other end of which is adapted to be operatively connected with the speedometer drive element, a stub shaft geared to said shaft and having a clutch member, a spindle alined with the stub shaft and having a cooperating clutch member, normally free from engagement with the clutch member of the stub shaft, a bell supported by the bracket, a clapper mounted to cooperate with the bell, means mounted on the spindle for operating the clapper when the clutch members are in engagement, and key actuated means for longitudinally shifting the spindle to bring the clutch members into engagement.

2. A theft alarm for motor vehicles embodying a bracket, one end of which is adapted to be secured to the speedometer nipple of a motor car chassis and the other end of which is adapted to be secured to the flexible conduit of the speedometer drive shaft of such vehicle, a shaft carried by the bracket, one end of which is adapted to be operatively connected to the speedometer shaft and the other end of which is adapted to be operatively connected with the speedometer drive element, a stub shaft geared to said shaft and having a clutch member, a standard mounted on the bracket, a spindle journalled for rotation in the standard and having a clutch member normally free from engagement with the clutch member of the stub shaft, a bell mounted on the standard, a clapper cooperable with the bell, means rotatable with the spindle for operating the clapper, and key controlled means for controlling the longitudinal position of the spindle to engage or disengage the clutch members.

3. A theft alarm for motor vehicles embodying a bracket, one end of which is adapted to be secured to the speedometer nipple of a motor car chassis and the other end of which is adapted to be secured to the flexible conduit of the speedometer drive shaft of such vehicle, a shaft carried by the bracket, one end of which is adapted to be operatively connected to the speedometer shaft and the other end of which is adapted to be operatively connected with the speedometer drive element, a stub shaft geared to said shaft and having a clutch member, a standard mounted on the bracket, a spindle journalled for rotation in the standard and having a clutch member normally free from engagement with the clutch member of the stub shaft, a bell mounted on the standard and having a hollow hub, a clapper cooperable with the bell, a spring for normally impelling the clapper in one direction, clapper operated means rotatable by the spindle for moving the clapper in the other direction, a lock mounted in the hub of the bell and comprising a rotatable barrel, and means operable through rotation of the barrel to effect the longitudinal shifting of the spindle for the purpose of engaging or disengaging the clutch members.

4. A theft alarm for motor vehicles embodying a bracket, one end of which is adapted to be secured to the speedometer nipple of a motor car chassis and the other end of which is adapted to be secured to the flexible conduit of the speedometer drive shaft of such vehicle, a shaft carried by the bracket, one end of which is adapted to be operatively connected to the speedometer shaft and the other end of which is adapted to be operatively connected with the speedometer drive element, a stub shaft geared to said shaft and having a clutch member, a standard mounted on the bracket, a spindle journalled for rotation in the standard and having a clutch member normally free from engagement with the clutch member of the stub shaft, a bell mounted on the standard and having a hollow hub, a clapper cooperable with the bell, a spring for normally impelling the clapper in one direction, clapper operated means rotatable by the spindle for moving the clapper in the other direction, a lock mounted in the hub of the bell and comprising a rotatable barrel, means operable through rotation of the barrel to effect the longitudinal shifting of the spindle for the purpose of engaging or disengaging the clutch members, and a casing enclosing the bell to preclude unauthorized persons from tampering with the bell.

5. A theft alarm for motor vehicles embodying a bracket, one end of which is adapted to be secured to the speedometer nipple of a motor car chassis and the other end of which is adapted to be secured to the flexible conduit of the speedometer drive shaft of such vehicle, a shaft carried by the bracket, one end of which is adapted to be operatively connected to the speedometer shaft and the other end of which is adapted to be operatively connected with the speedometer drive element, a stub shaft geared to said shaft and having a clutch member, a spindle alined with the stub shaft and having a cooperating clutch member, means for normally maintaining said clutch members free from engagement, a bell supported by the bracket, a clapper mounted to cooperate with the bell, members pivotally associated with the spindle for operating the clapper when the clutch members are in engagement and the spindle rotated in either direction, and key actuated means for longitudinally shifting the spindle to bring the clutch members into engagement.

In testimony whereof I have signed the foregoing specification.

HENRI SCHAEFER.